US009367941B2

(12) United States Patent
Chang et al.

(10) Patent No.: US 9,367,941 B2
(45) Date of Patent: Jun. 14, 2016

(54) IMAGE OUTPUT APPARATUS AND METHOD OF RENDERING AN IMAGE

(71) Applicant: SAMSUNG ELECTRONICS CO., LTD., Suwon-si (KR)

(72) Inventors: Chul-sang Chang, Seoul (KR); Seung-cheon Baek, Suwon-si (KR); Se-mi Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 14/530,096

(22) Filed: Oct. 31, 2014

(65) Prior Publication Data

US 2015/0145881 A1    May 28, 2015

(30) Foreign Application Priority Data

Nov. 28, 2013   (KR) ........................ 10-2013-0145969

(51) Int. Cl.
| | |
|---|---|
| *G09G 5/00* | (2006.01) |
| *G06T 11/60* | (2006.01) |
| *G06T 11/20* | (2006.01) |
| *G06T 11/40* | (2006.01) |

(52) U.S. Cl.
CPC .............. *G06T 11/60* (2013.01); *G06T 11/203* (2013.01); *G06T 11/40* (2013.01); *G06T 2200/12* (2013.01)

(58) Field of Classification Search
None
See application file for complete search history.

(56) References Cited

U.S. PATENT DOCUMENTS

| | | | |
|---|---|---|---|
| 8,203,564 B2* | 6/2012 | Jiao ........................ | G06T 15/005 345/421 |
| 2009/0027416 A1 | 1/2009 | Barone et al. | |
| 2012/0249569 A1* | 10/2012 | Kokojima ............. | G06T 11/203 345/582 |
| 2013/0141445 A1 | 6/2013 | Engh-Halstvedt et al. | |
| 2013/0249897 A1 | 9/2013 | Dunaisky et al. | |
| 2013/0293565 A1 | 11/2013 | Arvo | |

FOREIGN PATENT DOCUMENTS

JP    2013-137756 A    7/2013

OTHER PUBLICATIONS

Maule et al., "Transparency and Anti-Aliasing Techniques for Real-Time Rendering", 2012 XXV SIBGRAPI Conference on Graphics, Patterns and Images Tutorials, 10 pages.
Search Report, Issued by the International Searching Authority, Dated Feb. 11, 2015, in counterpart International Application No. PCT/KR2014/011515.
Written Opinion, Issued by the International Searching Authority, Dated Feb. 11, 2015, in counterpart International Application No. PCT/KR2014/011515.

* cited by examiner

*Primary Examiner* — Xiao Wu
*Assistant Examiner* — Mohammad H Akhavannik
(74) *Attorney, Agent, or Firm* — Sughrue Mion, PLLC

(57) ABSTRACT

An image output apparatus and a method of rendering an image thereof are provided. The method includes: a data input configured to receive stroke attribute information; a vertex generator configured to generate a vertex which indicates an outer appearance of a stroke based on the stroke attribute information; an alpha value setter configured to calculate a size of a texture based on the stroke attribute information and set an alpha value that will be stored in the texture; a UV setter configured to set UV information based on the stroke attribute information; a renderer configured to render the stroke based on the vertex, the texture in which the alpha value is stored and the UV information; and an output configured to output the rendered stroke.

20 Claims, 15 Drawing Sheets

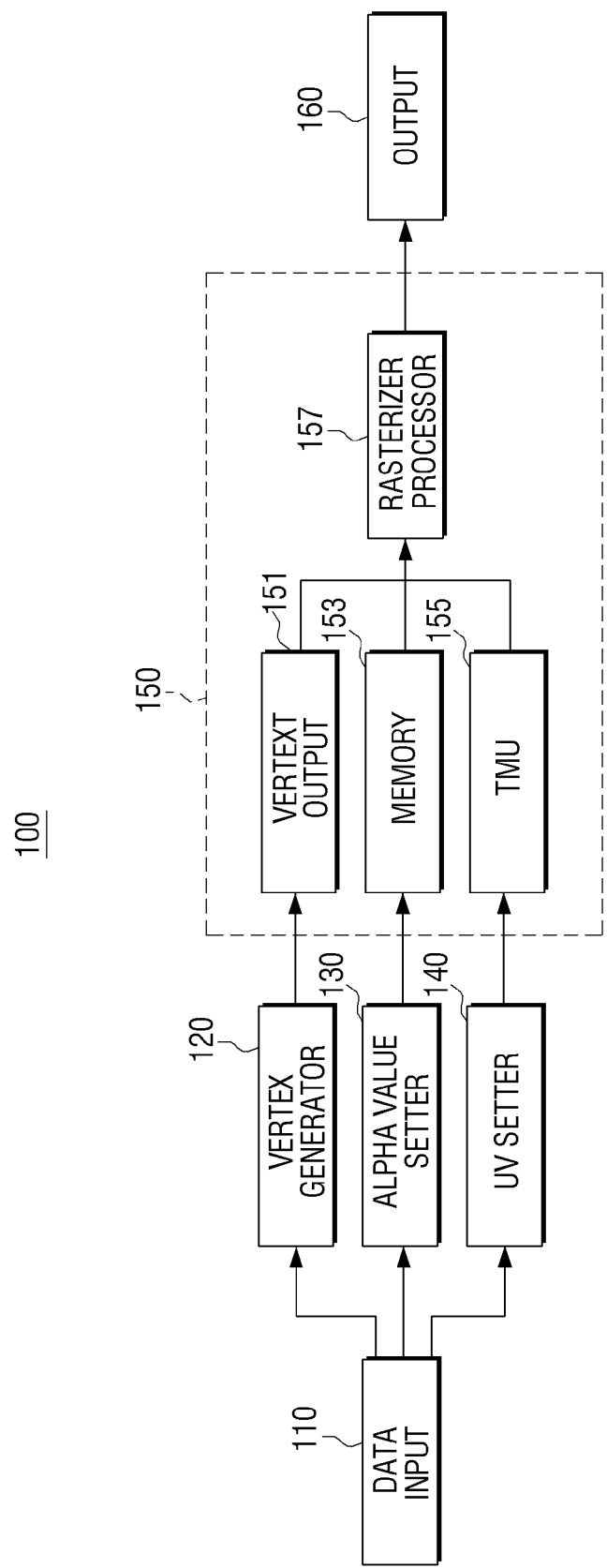

FIG. 3A
'butt' cap
'round' cap
'squarel' cap

FIG. 3B
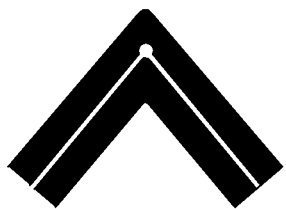
'miter' join
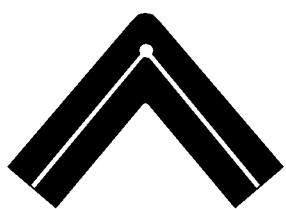
'round' join
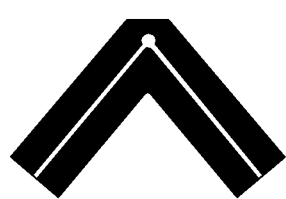
'bevel' join

[StrokeWidth 4 pixel]

[StrokeWidth 3.5 pixel]

[StrokeWidth 4 pixel]

<RELATED ART>

<EXEMPLARY EMBODIMENTS>

IMAGE OUTPUT APPARATUS AND METHOD OF RENDERING AN IMAGE

CROSS-REFERENCE TO RELATED APPLICATION(S)

This application claims priority under 35 U.S.C. §119 from Korean Patent Application No. 10-2013-0145969, filed on Nov. 28, 2013, in the Korean Intellectual Property Office, the disclosure of which is incorporated herein by reference, in its entirety.

BACKGROUND

1. Technical Field

Apparatuses and methods consistent with the exemplary embodiments generally relate to providing an image output apparatus and a method of rendering an image. More particularly, the exemplary embodiments relate to providing an image output apparatus for removing aliasing by using a texture and a method of rendering an image.

2. Description of the Related Art

A display apparatus outputs a primitive such as a line, a figure, or the like, that is output from an external source. A the primitive refers to an element constituting a line, a circle, a curve, a polygon, or the like, that may be actually drawn, stored, and controlled by a computer graphics program. In particular, the most basic primitive may be referred to as a line.

When a diagonal line or a figure is drawn or output by using an apparatus such as a computer, a user may easily detect aliasing, as shown in FIG. 1. This is caused by a pixel size or resolution of a display screen being sufficient for vision by a human. In other words, the display apparatus uses pixels smaller than a size that may be seen by a human and draws a line or a figure, which is a digital value, by using combinations of pixels, and thus, aliasing occurs.

Several methods of solving the problem of aliasing exist, but a multi-sample anti-aliasing (MSAA) method is mainly used in a mobile environment. In particular, the MSAA method sets several sub sample points in one pixel and determines a color of the pixel according to how much a line covers the sub sample points.

The MSAA method used in the mobile environment is simply applied but is based on sampling. Therefore, the MSAA method does not fully display all figure shapes, and the number of samples is increased to acquire a high-quality image. As a result, the MSAA method requires a large amount of operations.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide an image output apparatus that removes aliasing by using a texture and a method of rendering an image.

According to an aspect of the exemplary embodiments, there is provided a method of rendering an image. The method may include: receiving stroke attribute information; generating a vertex which indicates an outer appearance of a stroke based on the received stroke attribute information; calculating a size of a texture based on the received stroke attribute information and setting an alpha value that will be stored in the texture; setting ultraviolet (UV) information based on the received stroke attribute information; rendering the stroke based on the vertex, the texture in which the alpha value is stored and the UV information; and outputting the rendered stroke.

The stroke attribute information may include information related to at least one a width, a cap type and a join type of the stroke.

The setting of the alpha value may include: calculating a height and a width of the texture according the width of the stroke and the cap type of the stroke.

In response to an area of the stroke being a body area, the setting of the UV information may include: setting a place, which is 1 pixel respectively above and under an area in which the alpha value is stored, as UV coordinate, when the width of the stroke is an even number and setting a place, which is pixel of $$\frac{\text{Height of Body Area of Stroke}}{\text{StrokeWidth}}$$

away respectively above and under the area in which the alpha value is stored, as UV coordinate when the width of the stroke is an odd number.

In response to the area of the stroke being a cap area, the setting of the alpha value may include: determining an area in which the alpha value will be set according to the cap type and the width of the stroke.

The setting of the alpha value may include: not setting an additional area in which the alpha value will be set, when the cap type is a butt type, setting a semicircular having a radius of $$\frac{strokeWidth}{2}$$

to an additional area in which the alpha value will be set when the cap type is a round type, and setting a rectangle having a width of $$\frac{strokeWidth}{2}$$

and the same height as the width of the stroke to an additional area in which the alpha value will be set when the cap type is a square type.

The setting of the UV information may include: setting V coordinate equally to V coordinate of the body area of the stroke and moves U coordinate by 0.5 pixel inward and outwards from a left side of the body area of the stroke, and when the cap type is a round type, determining the width of the texture according to the width of the stroke when the cap type is a butt type.

In response to the cap type of the stroke being a round type or a square type cap, the width of the texture is determined according to the width of the stroke. Herein, 1 pixel of a first part and 1 pixel of an end part may be a space for setting UV coordinate preventing aliasing, and an alpha value for representing a square area may be stored in roundup $$\left(\frac{StrokeWidth}{2}\right).$$

In response to the area of the stroke being a join area, the setting of the UV information may include: representing the join area as a combination of triangles having height of $$\frac{strokeWidth}{2}$$

and setting UV coordinates of the triangles to an area which corresponds to ½ of UV coordinate of the body area of the stroke.

According to another aspect of the exemplary embodiments, there is provided an image output including: a data input configured to receive stroke attribute information; a vertex generator configured to generate a vertex which indicates an outer appearance of a stroke based on the received stroke attribute information; an alpha value setter configured to calculate a size of a texture based on the received stroke attribute information and set an alpha value to be stored in the texture; a UV setter configured to set UV information based on the received stroke attribute information; a renderer configured to render the stroke based on the generated vertex, the texture in which the alpha value is stored, and the UV information; and an output configured to output the rendered stroke.

The stroke attribute information may include information related to at least one of a width, a cap type, and a join type of the stroke.

The alpha value setter may be configured to calculate a height and a width of the texture according the width of the stroke and the cap type of the stroke.

In response to an area of the stroke being a body area, and the width of the stroke being an even number, the UV setter may set a place, which is 1 pixel respectively above and under an area in which the alpha value is stored, as UV coordinate, and in response to the width of the stroke being an odd number, set a place as UV coordinate, which is pixel of $$\frac{\text{Height of Body Area of Stroke}}{StrokeWidth}$$

respectively above and under the area in which the alpha value is stored.

In response to the area of the stroke being a cap area, the alpha value setter may be configured to determine an area in which the alpha value will be set according to the cap type and the width of the stroke.

In response to the cap type being a butt type, the alpha value setter may not set an additional area in which the alpha value will be set, and in response to the cap type being a round type cap, the alpha setter may set a semicircular having a radius of $$\frac{strokeWidth}{2}$$

to an additional area in which the alpha value will be set, and in response to the cap type being a square type cap, the alpha setter may set a rectangle having a width of $$\frac{strokeWidth}{2}$$

and the same height as the width of the stroke to an additional area in which the alpha value is to be set.

In response to the cap type being a butt type cap, the UV setter may set a V coordinate equal to the V coordinate of the body area of the stroke and move the U coordinate by 0.5 pixel inward and outwards from a left side of the body area of the stroke.

In response to the cap type of the stroke being a round type or a square type cap, the width of the texture is determined according to the width of the stroke. Herein, 1 pixel of a first part and 1 pixel of an end part may be a space for setting UV coordinate which prevents aliasing, and an alpha value for representing a square area may be stored in $$\text{roundup}\left(\frac{StrokeWidth}{2}\right).$$

In response to the area of the stroke being a join area, the UV setter may represent the join area as a combination of triangles having height of $$\frac{strokeWidth}{2}$$

and may set UV coordinates of the triangles to an area which corresponds to ½ of UV coordinate of the body area of the stroke.

An aspect of an exemplary embodiment may provide an apparatus for removing aliasing by using a texture, the apparatus including: a vertex generator configured to generate a vertex which indicates an outer appearance of a stroke; an alpha value setter configured to calculate a size of a texture and set an alpha value that will be stored in the texture; a UV setter configured to set UV information; and a renderer configured to render the stroke based on the vertex, the texture in which the alpha value is stored and the UV information.

The apparatus may further include a data input configured to receive stroke attribute information.

The apparatus may further include an output configured to output the rendered stroke.

The vertex, alpha value and UV information may be generated based on the received stroke attribute information.

BRIEF DESCRIPTION OF THE DRAWINGS

The above and/or other aspects will be more apparent by describing certain exemplary embodiments with reference to the accompanying drawings, in which:

FIG. 2 is a block diagram which illustrates a structure of an image output apparatus according to an exemplary embodiment;

FIGS. 3A and 3B are views which illustrate a type of cap area and a type of join area, according to an exemplary embodiment;

DETAILED DESCRIPTION OF THE EXEMPLARY EMBODIMENTS

Figure 1:
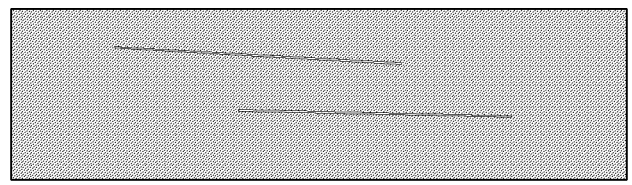
FIG. 1 is a view which illustrates aliasing.

Exemplary embodiments are now described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 2 is a block diagram which illustrates a structure of an image output apparatus 100 according to an exemplary embodiment. Referring to FIG. 2, the image output apparatus 100 includes a data input 110, a vertex generator 120, an alpha value setter 130, an ultraviolet (UV) setter 140, a renderer 150 and an output 160.

The data input 110 receives image data from an external source. In particular, the data input 110 may receive stroke attribute information. The stroke attribute information may include information related to a vertex and information related to at least one of a width, a cap type, and a join type of a stroke. A cap of the stroke is an end shape of the stroke, and examples of a cap type of the stroke may include a butt cap, a round cap, and a square cap, as shown in FIG. 3A. Also, a join of the stroke is a shape of a joined part between two strokes, and examples of a join type of a stroke may include a miter join, a round join, and a bevel join as shown in FIG. 3B.

The vertex generator 120 generates a vertex based on the stroke attribute information input through the data input 110. In particular, the vertex generator 120 may generate the vertex based on position information of a vertex included in the stroke attribute information, information related to whether the vertex is concave or convex, etc. The position information related to the vertex may include coordinate values of vertexes and information related to a triangle formed by the vertexes. The vertex generated by vertex generator 120 may be output to a vertex output 151 of renderer 150.

The alpha value setter 130 calculates a size of a texture based on the stroke attribute information and sets an alpha value that will be stored in the texture. In particular, the alpha value setter 130 may calculate the size of the texture that will represent the stroke, by using information related to a width of the stroke and a cap type among the stroke attribute information.

In particular, the alpha value setter 130 may calculate a height of the texture as in Equation 1, below.

$$\text{Height} = 2 + \text{roundup}\left(\frac{strokeWidth}{2}\right) \times 2 + 2 \quad (1)$$

The alpha value setter 130 may calculate a width of the texture by using different methods according to the cap type of the stroke.

In response to the cap type of the stroke being a butt type cap, the alpha value setter 130 may calculate the width of the texture as in Equation 2 below.

$$\text{Width} = 1 + 2 + 1 = 4 \quad (2)$$

In other words, in response to the cap type of the stroke being the butt type, the width of the texture requires 4 pixels. 1 pixel of a first part and 1 pixel of an end part is a space for setting a UV coordinate for preventing aliasing, and an alpha value for representing a body area of the stroke is stored in 2 pixels of a center.

In response to the cap type of the stroke being a round type or a square type, the alpha value setter 130 may calculate the width of the texture as in Equation 3 below.

$$\text{Height} = 1 + \text{roundup}\left(\frac{StrokeWidth}{2}\right) \times 2 + 1 \quad (3)$$

In other words, in response to the cap type of the stroke being the round type or the square type, the width of the stroke is determined according to the width of the stroke. Herein, 1 pixel of the first part and 1 pixel of the end part is a space for setting a UV coordinate for preventing aliasing, and an alpha value for representing round and square areas of the stroke is stored in $$\text{roundup}\left(\frac{StrokeWidth}{2}\right).$$

Herein, 1 pixel of the first part and 1 pixel of the end part is a space for setting an UV coordinate for preventing aliasing, and an alpha value for representing the round and square areas of the stroke is stored in $$\text{roundup}\left(\frac{StrokeWidth}{2}\right).$$

As described above, the alpha value setter 130 may calculate the size of the texture based on the calculated height and width of the texture as in Equation 4, below.

$$\text{TotalSize} = \text{Width} \times \text{Height} \times 1 \text{ byte} \quad (4)$$

1 byte is used per pixel in the above-described exemplary embodiment, but 1 byte or more values may be set per pixel to more precise representation.

The alpha value setter 130 may also set an alpha value that will be stored in the calculated texture. In particular, the alpha value setter 130 may set the alpha value by using different methods according to areas of the stroke.

The alpha value setter 130 may set an alpha value in a body area of the stroke having a width of 2 pixels and a height of $$\text{roundup}\left(\frac{StrokeWidth}{2}\right)*2.$$

In response to a gray scale range being from 0 to 255, an alpha value that will be set may be 255.

Figure 4A:
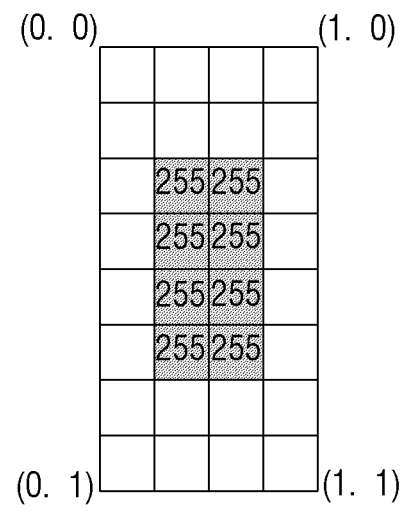
FIGS. 4A and 4B are views which illustrate an alpha value to represent a stroke body area in response to widths of a stroke being respectively 3.5 pixel and 4 pixel, according to an exemplary embodiment.
Figure 4B:
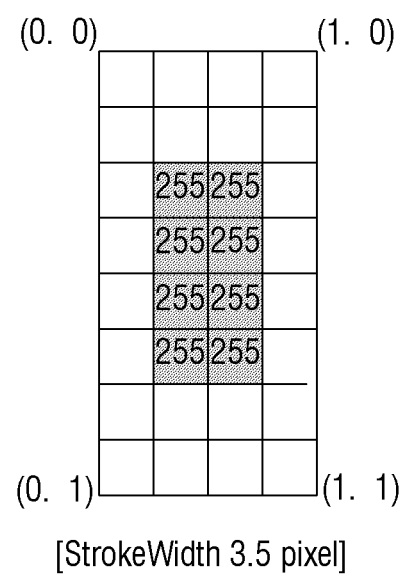

As described above, although a value of a stroke width varies, an area in which an alpha value is stored may be the same. For example, in response to a width of a stroke being 4 pixels, an area in which an alpha value will be stored has a width of 2 pixels and a height of 4 pixels as shown in FIG. 4A. In response to the width of the stroke being 3.5 pixels, the area of the alpha value will be area which has a width of 2 pixels and a height of 4 pixels, as shown in FIG. 4B. In this case, a value that is output from a frame buffer may be adjusted through an adjustment of an UV coordinate that will be described later.

The alpha value setter 130 may set an alpha value of a cap area according to a cap type of stroke. In particular, in response to a type of a cap area being a butt area, the alpha value setter 130 may not add an area in which an alpha value will be stored for the cap area.

However, in response to the type of the cap area being a round area or a square area, the alpha value setter 130 may add an area in which the alpha value of the cap area. For example, in response to the type of cap area being the round area, the alpha value setter 130 may add an area that will be a semicircle having a radius of $$\frac{strokeWidth}{2}.$$

For example, in response to the cap type being the round area, the alpha value setter 130 may add an area in which a semicircular alpha value having a radius of $$\frac{strokeWidth}{2}$$

will be stored. In response to the cap type being the square area, the alpha setter 130 may add an area in which a rectangular alpha value having a width of $$\frac{strokeWidth}{2}$$

and a height of StrokeWidth will be stored.

In case of a join area of the stroke, the alpha value setter 130 does not add an area in which an alpha value will be stored.

An alpha value set by the alpha value setter 130 may be output to and stored in a memory 153 of the renderer 150.

The UV setter 140 may set an UV coordinate value for performing interpolation when actually performing rendering by using a texture. The UV setter 140 may set the UV coordinate value by using different methods according to an area of a stroke.

In particular, in response to an area of the stroke being a body area, the UV setter 140 may set the UV coordinate value by using different methods, according to a condition of a width of the stroke.

Figure 5A:
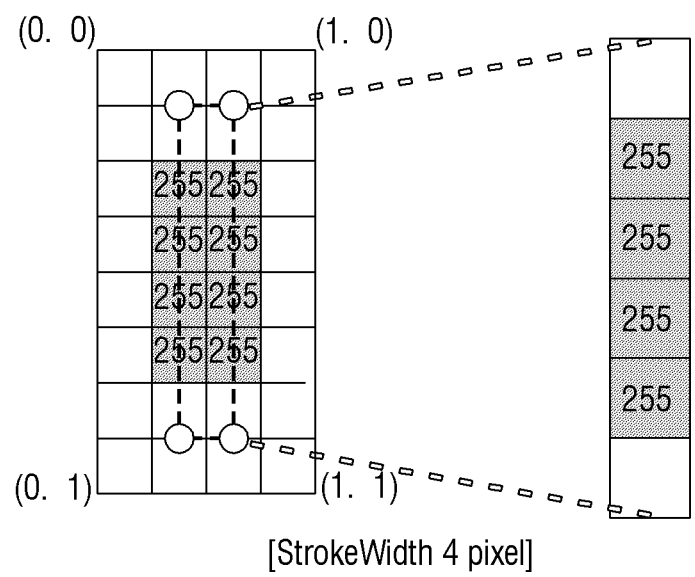
FIGS. 5A and 5B are views which illustrate a method of setting and rendering an ultraviolet (UV) coordinate value of a stroke body area in response to widths of a stroke being respectively 3.5 and 4, according to an exemplary embodiment.

In particular, in response to the width of the stroke being an integer and an even number, the UV setter 140 may set the UV coordinate value at a place that is 1 pixel away, respectively, above and under the body area in which the alpha value is stored. For example, as shown in FIG. 5A, in response to the width of the stroke being 4 pixels, the UV setter 140 may set the UV coordinate value at a place that is 1 pixel, respectively, above and under the body area in which the alpha value is stored. In this case, as shown on the right side of FIG. 5A, the renderer 150 may render a stroke by using 4 pixels without performing an additional interpolation operation.

Figure 5B:
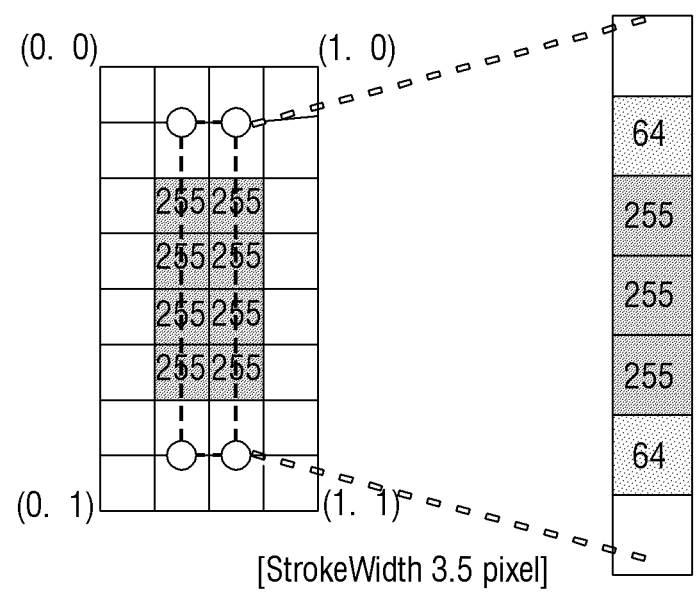

In response to the width of the stroke being an odd number or a decimal, the UV setter 140 may set the UV coordinate value at a place that is pixel of $$\frac{\text{Height of } StrokeBody \text{ Alpha Area}}{StrokeWidth}$$

respectively, above and under the body area in which the alpha value is stored. For example, as shown in FIG. 5B, in response to the width of the stroke being 3.5 pixels, the UV setter 140 may set the UV coordinate value at a place that is about 1.14 pixel; respectively, above and under the body area in which the alpha value is stored. In this case, as shown on the left side of FIG. 5B, the renderer 150 may render a stroke through an interpolation operation of a texture mapping unit (TMU) 155. In other words, the renderer 150 may render center 3 pixels into 255 gray scale and render pixels respectively above and under the center 3 pixels into 64 gray scale.

In response to the area of the stroke being a cap area, the UV setter 140 may set the UV coordinate value by using different methods, according to a cap type.

Figure 6A:
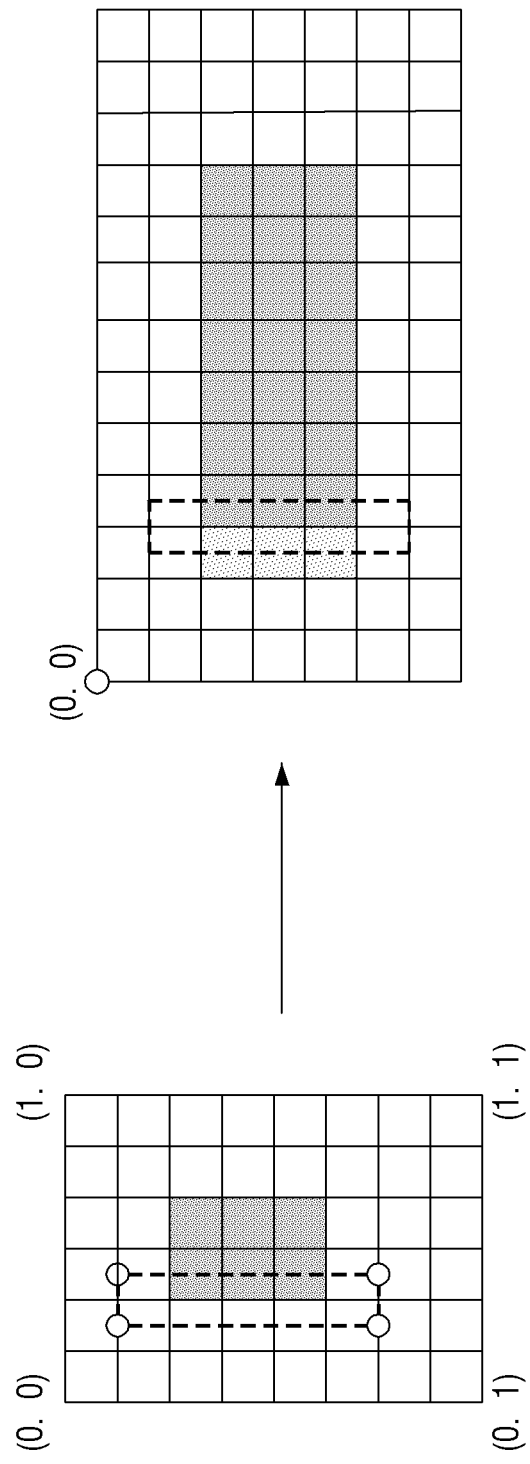
FIGS. 6A and 6B are views which illustrate a method of setting and rendering a UV coordinate value according to a cap type of a stroke, according to an exemplary embodiment.

In response to the cap area being a butt area, the UV setter 140 may set the UV coordinate value at a place that has the same coordinate as a V coordinate of the body area of the stroke but, has a U coordinate that is moved by each 0.5 pixel inside and outside from a left side of the body area of the stroke. In particular, in response to the cap area being the butt area, the UV setter 140 may set the UV coordinate value at a place that is moved by 1 pixel, respectively, above and under the body area of the stroke and moved by 0.5 pixel respectively inside and outside based on a left side as shown in FIG. 6A. In this case, as shown on the right side of FIG. 6A, the renderer 150 may render the cap area of the stroke through an interpolation operation of the TMU 155. In the words, the renderer 150 may perform the interpolation operation so that the cap area has gray scale 1 pixel lower than the body area from the left side of the body area.

Figure 6B:
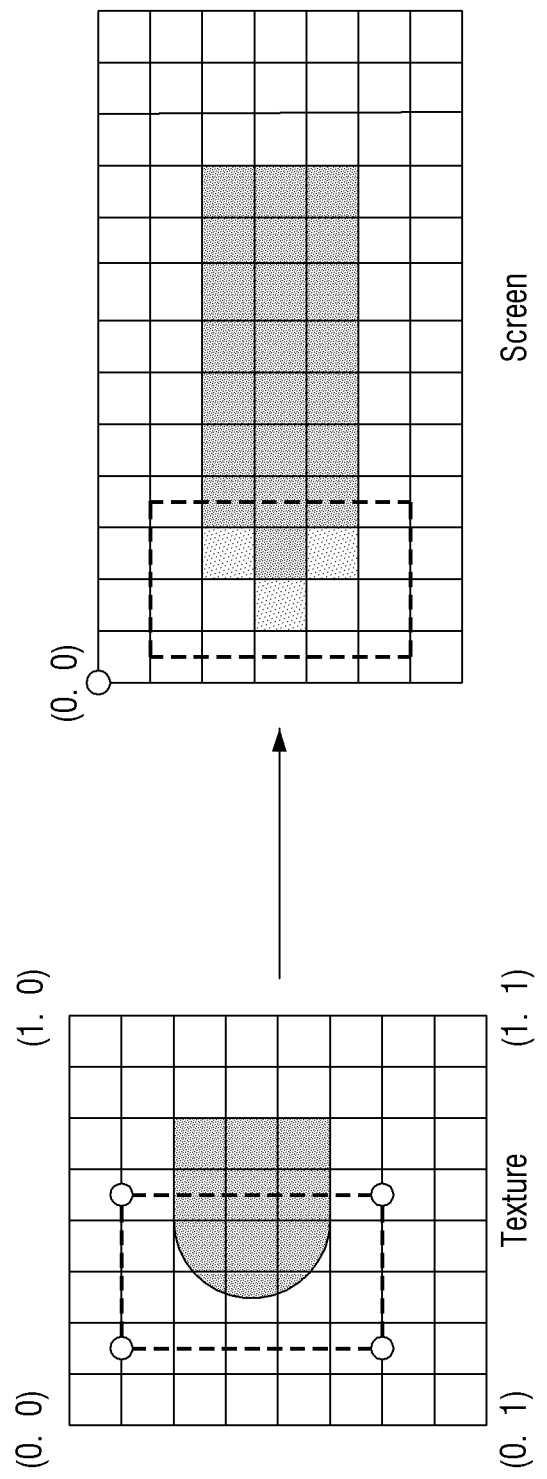

In response to the cap area being a round cap or a square cap, the UV setter 140 may set the UV coordinate value at a place that has the same coordinate as the V coordinate of the body area of the stroke but has a U coordinate that is moved by 0.5 pixel inward from the left side of the body area and moved by 0.5 pixel outwards from the rightmost pixel of pixels in which the cap area of the stroke is positioned. In particular, in response to the cap area being the round area, the UV setter 140 may set the UV coordinate value at a place that is moved by 1 pixel, respectively, above and under the body area of the stroke, moved by 0.5 pixel from the left side of the body area, and is moved by 0.5 outwards from the rightmost pixel of pixels of a semicircle of the texture as shown in FIG. 6B. In this case, as shown on the right side of FIG. 6B, the renderer 150 may render the cap area of the stroke through the interpolation operation of the TMU 155.

In particular, in response to the renderer 150 rendering a round cap area by using a texture, the number of vertexes may be reduced. As a result, the amount of processed data may be reduced, and rendering speed may be improved.

Figure 7:
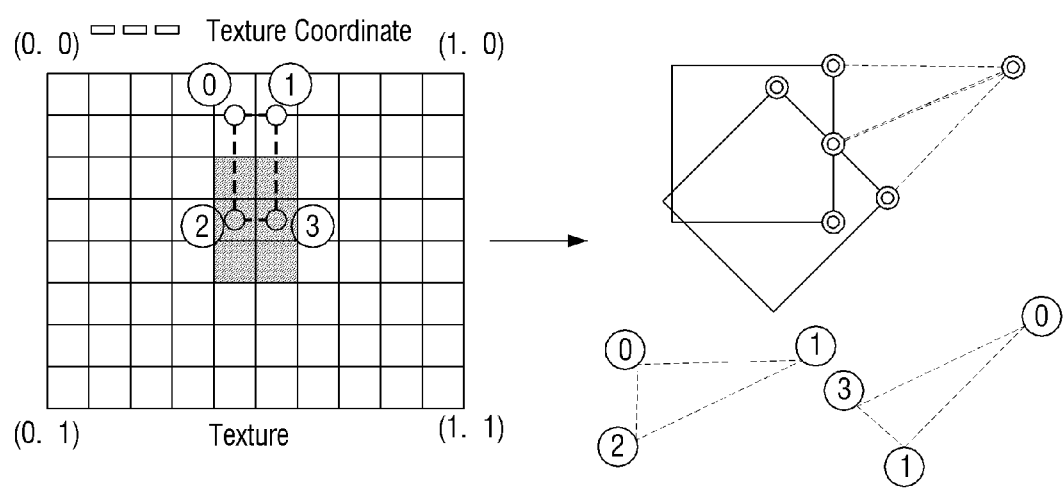
FIG. 7 is a view which illustrates a method of setting and rendering a UV coordinate value in a join area of a stroke, according to an exemplary embodiment.

The UV setter 140 may represent a join area of the stroke as a combination of triangles having heights of $$\frac{StrokeWidth}{2}$$

as shown on the right side of FIG. 7 and set a UV coordinate of the heights of the triangles at a place which corresponds to ½ of the UV coordinate.

The renderer 150 renders the stroke based on the vertex output from the vertex generator 120, the alpha value output from the alpha setter 130, and UV information output from the UV setter 140.

In particular, as shown in FIG. 2, the renderer 150 includes the vertex output 151, the memory 153, the TMU 155, and a rasterizer processor 157. The vertex output 151 outputs the vertex generated by the vertex generator 110 and stores a texture in which an alpha value is stored in the memory 153. In response to a size of the texture being different from a size of an output area, the TMU 155 may perform an interpolation operation by using color information related to the texture. The rasterizer processor 157 performs a rasterization rendering operation based on vertex information, the texture, and alpha value information. The rasterization rendering operation is a method of converting vector and contour line data generated by using the vertex into a pixel pattern image, based on the texture and the alpha value information in order to generate a screen.

The output 160 outputs the stroke rendered by the renderer 150. The output 160 may be implemented as a display apparatus such as a display, but this is only an exemplary embodiment. Therefore, the output 160 may be implemented as a printing apparatus such as a printer, or the like.

Figure 8A:
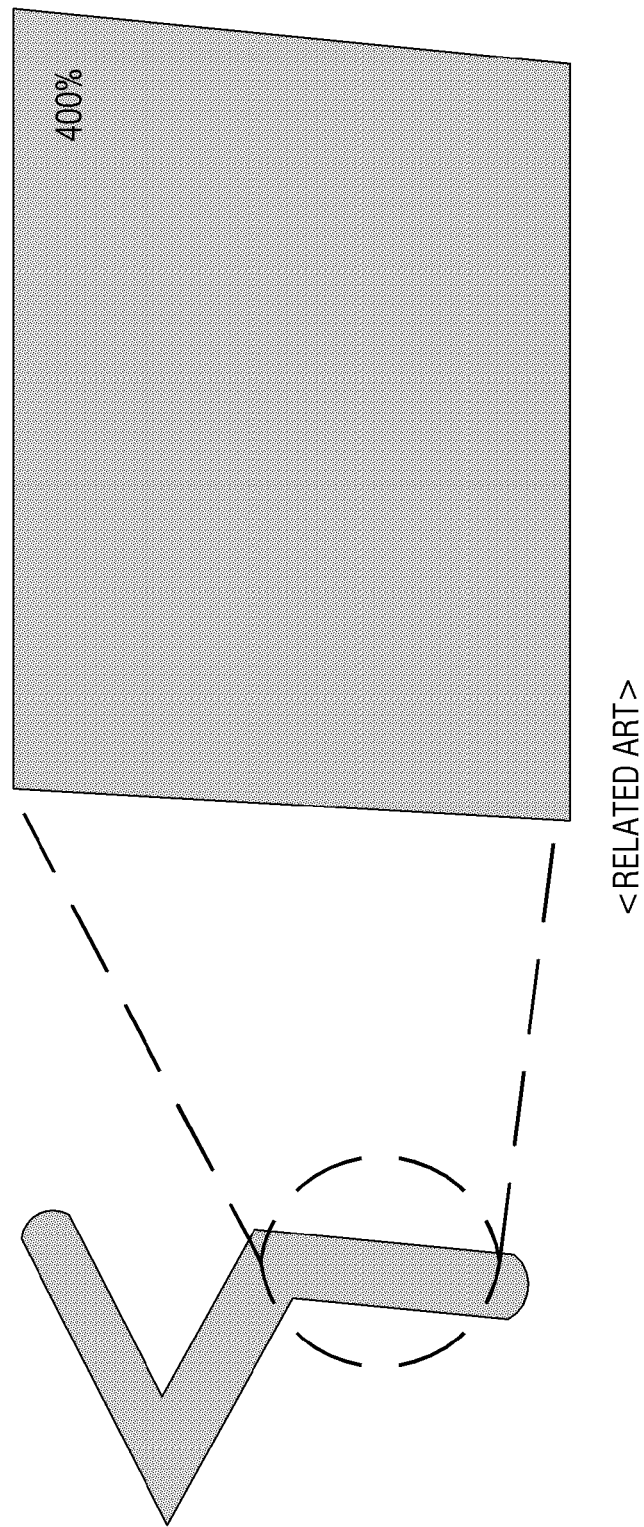
FIGS. 8A through 8C are views and a graph which illustrate a comparison between the related art and an exemplary embodiment.
Figure 8B:
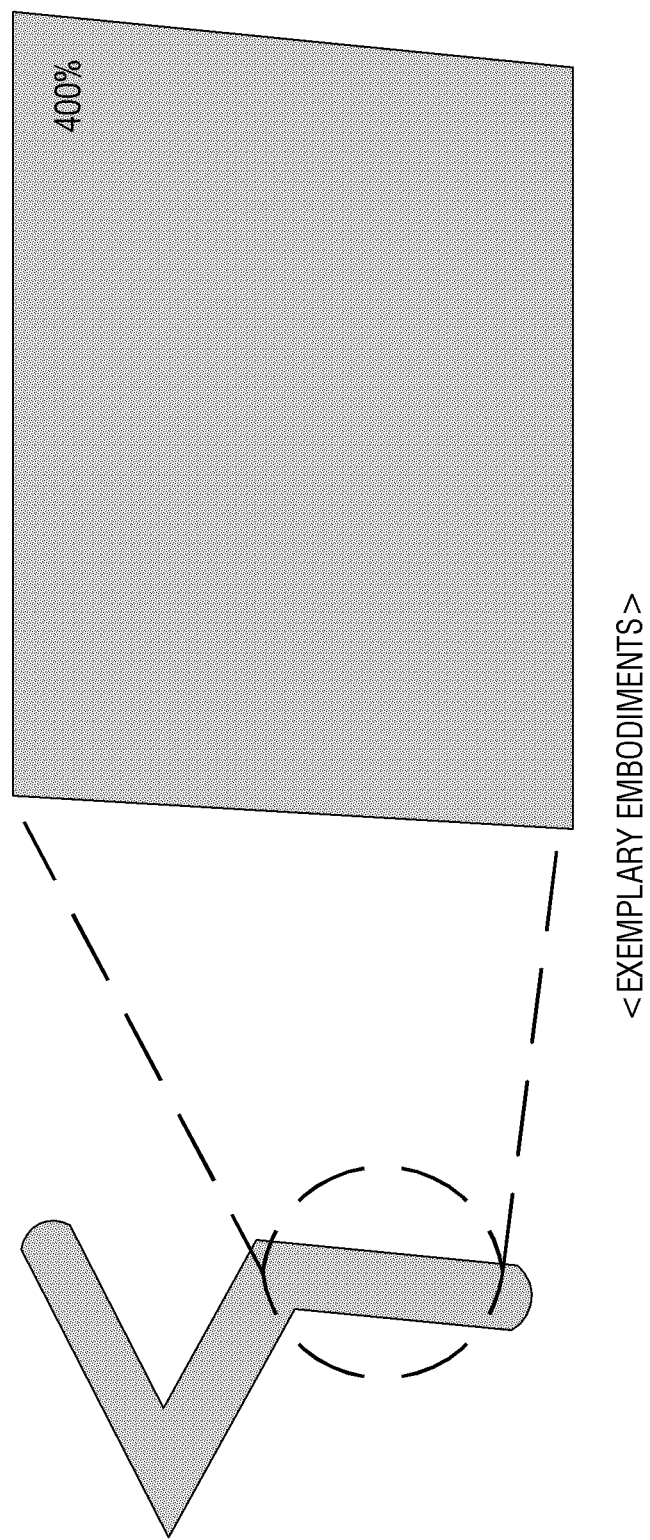

An image output apparatus as described above may more effectively remove aliasing and output a relatively higher-quality image than in the related art. In particular, FIG. 8A illustrates a result of rendering a stroke according to the related art, and FIG. 8B illustrates a result of rendering a stroke according to an exemplary embodiment. In other words, as shown in FIGS. 8A and 8B, aliasing of a stroke according to an exemplary embodiment is more effectively removed than aliasing of a stroke according to the related art. Therefore, according to the exemplary embodiments, a higher-quality stroke may be output.

Figure 8C:
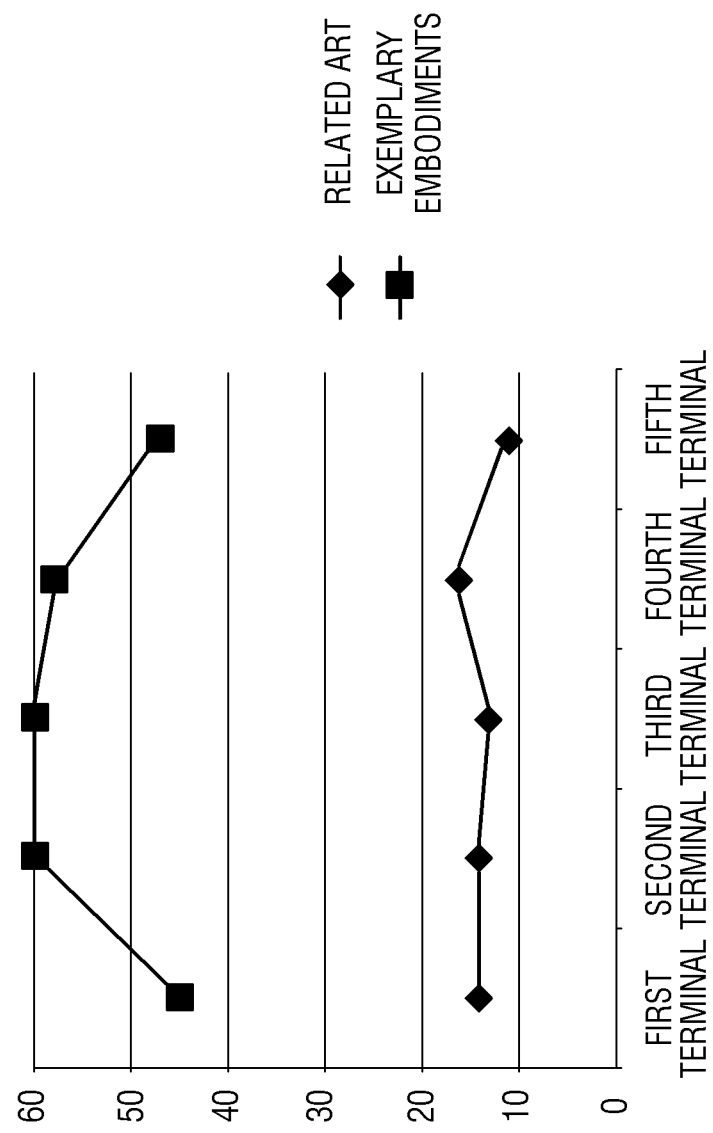

In response to the aliasing being removed by using a texture, an image may be rendered at a faster speed than in the related art. In particular, as shown in FIG. 8C, a rendering operation according to an exemplary embodiment may be performed at a faster speed, i.e., between 3 times and 4 times in all types of terminals than a rendering operation performed in the related art.

Figure 9:
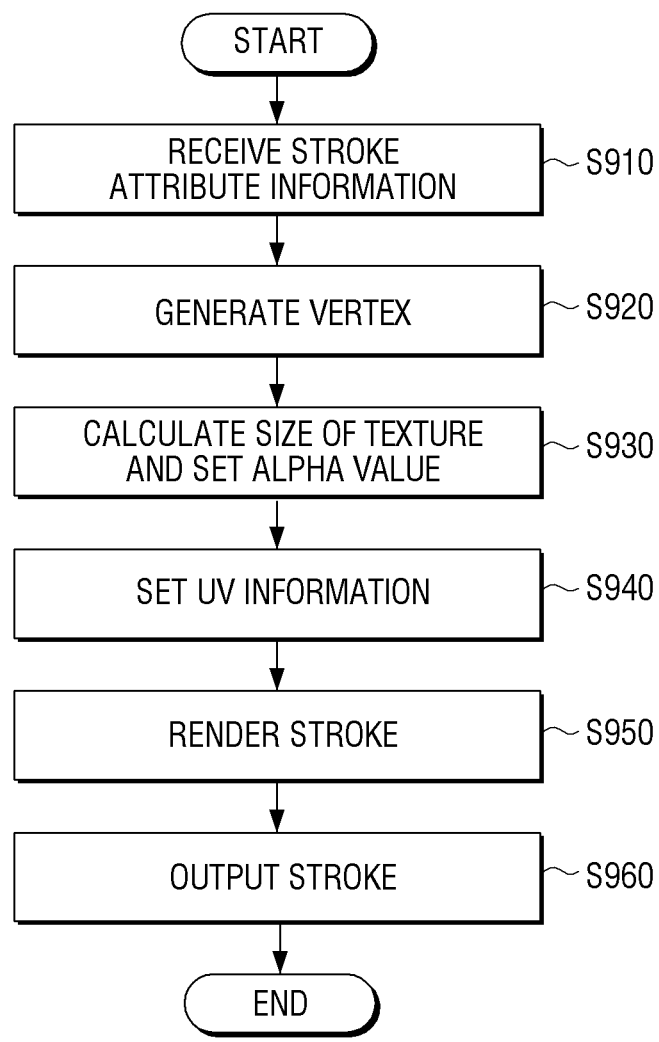
FIG. 9 is a flowchart which illustrates a method of rendering an image, according to an exemplary embodiment.

FIG. 9 is a flowchart which illustrates a method of rendering an image, according to an exemplary embodiment.

In operation S910, the image output apparatus 100 receives stroke attribute information. Here, the stroke attribute information may include information related to a width of a stroke, a type of a cap area of the stroke, a type of a join area of the stroke, and a vertex, etc.

In operation S920, the image output apparatus 100 generates a vertex based on the stroke attribute information.

In operation S930, the image output apparatus 100 calculates a size of a texture based on the stroke attribute information and sets an alpha value that will be stored in the texture.

The image output apparatus 100 may calculate the size of the texture according to the width of the stroke and the type of cap area. The image output apparatus 100 may also set the alpha value that will be stored in the texture, by using different methods in respective areas of the stroke. In particular, in response to the cap area being a round cap or a square cap, the image output apparatus 100 may add an area in which the alpha value will be stored to set the alpha value.

In operation S940, the image output apparatus 100 sets UV information based on the stroke attribute information. In particular, the image output apparatus 100 may set an UV coordinate value by using different methods in respective areas of the stroke. In particular, in case of a body area of the stroke, in response to the width of the stroke being an even number, the image output apparatus 100 may set a place, which is 1 pixel away, respectively, above and under the area in which the alpha value is stored, as an UV coordinate. In response to the width of the stroke being an odd number, the image output apparatus 100 may set a place, which is pixel of $$\frac{\text{Height of Body Area of Stroke}}{\text{Width of Stroke}}$$

away, respectively above and under the area in which the alpha value is stored, as an UV coordinate. In response to an area of the stroke being a butt cap type, the image output apparatus 100 may set the V coordinate equally to the V coordinate of the body area of the stroke and move the U coordinate by 0.5 pixel inward and outwards from a left side of the body area of the stroke. In the case of the join area of the stroke, the image output apparatus 100 may represent the join area as a combination of triangles having height of $$\frac{StrokeWidth}{2}$$

and may set UV coordinates of the triangles as an area which corresponds to ½ of the UV coordinate of the body area of the stroke.

In operation S950, the image output apparatus 100 renders the stroke based on the vertex, the texture in which the alpha value is stored, and the UV information. In particular, the image output apparatus 100 may perform an interpolation operation by using the TMU 155 to remove aliasing.

In operation S960, the image output apparatus 100 outputs the rendered stroke.

According to the method of rendering the image as described above, the image output apparatus 100 may render a high-quality image at a faster speed than in the related art.

According to various exemplary embodiments as described above, an image output apparatus may render a high-quality image at a faster speed.

A program code for performing a method of rendering an image according to various exemplary embodiments as described above may be stored on a computer-readable recording medium. In particular, the program code may be stored on various types of computer-readable recording media such as a random access memory (ROM), a flash memory, a read only memory (ROM), an erasable programmable ROM (EPROM), an electronically erasable and programmable ROM (EEPROM), a register, a hard disc, a removable disc, a memory card, a universal serial bus (USB) memory, a CD-ROM, etc.

The foregoing exemplary embodiments and advantages are merely exemplary and are not to be construed as limiting. The present teachings can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of rendering an image, the method comprising:
   receiving stroke attribute information;
   generating a vertex which indicates an outer appearance of a stroke based on the stroke attribute information;
   calculating a size of a texture based on the stroke attribute information and setting an alpha value that will be stored in the texture;
   setting ultraviolet (UV) information based on the stroke attribute information;
   rendering the stroke based on the vertex, the texture in which the alpha value is stored, and the UV information; and
   outputting the rendered stroke.

2. The method of claim 1, wherein the stroke attribute information comprises information related to at least one of a width, a cap type and a join type of the stroke.

3. The method of claim 2, wherein the setting of the alpha value comprises:
   calculating a height and a width of the texture according the width of the stroke and the cap type of the stroke.

4. The method of claim 1, wherein in response to an area of the stroke being a body area, the setting of the UV information comprises:
   setting a place, which is 1 pixel respectively above and under an area in which the alpha value is stored, as UV coordinate, when the width of the stroke is an even number, and setting a place, which is pixel of $$\frac{\text{Height of Body Area of Stroke}}{\text{StrokeWidth}}$$

away respectively above and under the area in which the alpha value is stored, as UV coordinate when the width of the stroke is an odd number.

5. The method of claim 1, wherein in response to the area of the stroke being a cap area, the setting of the alpha value comprises:
   determining an area in which the alpha value will be set according to the cap type and the width of the stroke.

6. The method of claim 5, wherein the setting of the alpha value comprises:
   not setting an additional area in which the alpha value will be set when the cap type is a butt type, and setting a semicircular having a radius of $$\frac{strokeWidth}{2}$$

to an additional area in which the alpha value will be set when the cap type is a round type, and in response to the cap type being a square type, setting a rectangle having a width of $$\frac{strokeWidth}{2}$$

and the same height as the width of the stroke to an additional area in which the alpha value will be set.

7. The method of claim 6, wherein the setting of the UV information comprises:
   setting the V coordinate equally to the V coordinate of the body area of the stroke and moving the U coordinate by 0.5 pixel inward and outwards from a left side of the body area of the stroke, and when the cap type is a round type, determining the width of the texture according to the width of the stroke.

8. The method of claim 1, wherein in response to the area of the stroke being a join area, the setting of the UV information comprises:
   representing the join area as a combination of triangles having height of $$\frac{strokeWidth}{2}$$

and setting UV coordinates of the triangles to an area which corresponds to ½ of UV coordinate of the body area of the stroke.

9. An image output comprising:
   a data input configured to receive stroke attribute information;
   a vertex generator configured to generate a vertex which indicates an outer appearance of a stroke based on the stroke attribute information;
   an alpha value setter configured to calculate a size of a texture based on the stroke attribute information and set an alpha value that will be stored in the texture;
   a UV setter configured to set UV information based on the stroke attribute information;
   a renderer configured to render the stroke based on the vertex, the texture in which the alpha value is stored and the UV information; and
   an output configured to output the rendered stroke.

10. The image output apparatus of claim 9, wherein the stroke attribute information comprises information related to at least one of a width, a cap type and a join type of the stroke.

11. The image output apparatus of claim 10, wherein the alpha value setter is configured to calculate a height and a width of the texture according the width of the stroke and the cap type of the stroke.

12. The image output apparatus of claim 9, wherein in response to an area of the stroke being a body area, and the width of the stroke is an even number, the UV setter sets a place, which is 1 pixel, respectively, above and under an area in which the alpha value is stored, as the UV coordinate, and in response to the width of the stroke being an odd number, sets a place, which is pixel of $$\frac{\text{Height of Body Area of Stroke}}{\text{StrokeWidth}}$$

away, respectively, above and under the area in which the alpha value is stored, as UV coordinate.

13. The image output apparatus of claim 9, wherein the alpha value setter determines an area in which the alpha value will be set according to the cap type and the width of the stroke when the area of the stroke is a cap area.

14. The image output apparatus of claim 13, wherein in response to the cap type being a butt type, the alpha value setter does not set an additional area in which the alpha value will be set, in response to the cap type being a round type, sets a semicircular having a radius of $$\frac{strokeWidth}{2}$$

to an additional area in which the alpha value will be set, and in response to the cap type being a square type, sets a rectangle having a width of $$\frac{strokeWidth}{2}$$

and the same height as the width of the stroke to an additional area in which the alpha value will be set.

15. The image output apparatus of claim 14, wherein in response to the cap type being a butt type, the UV setter sets the V coordinate equally to the V coordinate of the body area of the stroke, moves the U coordinate by 0.5 pixel inward and outwards from a left side of the body area of the stroke, and in response to the cap type being a round type or a square type, determines the width of the texture according to the width of the stroke.

16. The image output apparatus of claim 9, wherein in response to the area of the stroke being a join area, the UV setter represents the join area as a combination of triangles having height of $$\frac{strokeWidth}{2}$$

and sets UV coordinates of the triangles to an area which corresponds to ½ of the UV coordinate of the body area of the stroke.

17. An apparatus for removing aliasing by using a texture, the apparatus comprising:
 a vertex generator configured to generate a vertex which indicates an outer appearance of a stroke;
 an alpha value setter configured to calculate a size of a texture and set an alpha value that will be stored in the texture;
 a UV setter configured to set UV information; and
 a renderer configured to render the stroke based on the vertex, the texture in which the alpha value is stored and the UV information.

18. The apparatus of claim 17, further comprising a data input configured to receive stroke attribute information.

19. The apparatus of claim 18, wherein the vertex, alpha value and UV information are generated based on the received stroke attribute information.

20. The apparatus of claim 17, further comprising an output configured to output the rendered stroke.

\* \* \* \* \*